April 24, 1962 R. A. FOSTER 3,031,156
EXHAUST SYSTEMS FOR JET PROPULSION ENGINES
Filed Nov. 3, 1958 2 Sheets-Sheet 2

United States Patent Office 3,031,156
Patented Apr. 24, 1962

3,031,156
EXHAUST SYSTEMS FOR JET PROPULSION ENGINES
Richard Armstrong Foster, Bristol, England, assignor, by mesne assignments, to Bristol Siddeley Engines Limited, Bristol, England, a British company
Filed Nov. 3, 1958, Ser. No. 771,651
Claims priority, application Great Britain Nov. 8, 1957
9 Claims. (Cl. 244—15)

The invention relates to the suppression of noise emitted by exhaust systems for jet propulsion engines, that is to say systems for discharging in the form of a propulsive jet the jet streams of the engines. Such a system usually comprises a jet pipe which may terminate in a jet nozzle.

According to this invention there is provided an aircraft having wing means and a jet propulsion engine, the engine having a jet pipe, which terminates in rearwardly-facing propulsion nozzle means, second rearwardly-facing propulsion nozzle means mounted in the wing means and comprising a stack of engine effluent gas discharge passages of elongated flow section spaced apart to cause the gas to be discharged as a plurality of separate streams, and guide means selectively operable into either of two conditions in one of which conditions the engine effluent gases are caused to pass to the first said propulsion nozzle means and in the other of which conditions the engine effluent gases are caused to pass to the second propulsion nozzle means.

The term "jet propulsion engine" is intended to include not only a pure jet propulsion engine but also a propulsion engine in which only a proportion of the propulsive thrust is derived from a jet stream, for example a turbo-prop engine in which the gases exhausting from the turbine system of the engine are discharged rearwardly as a propulsive jet.

Figure 1:
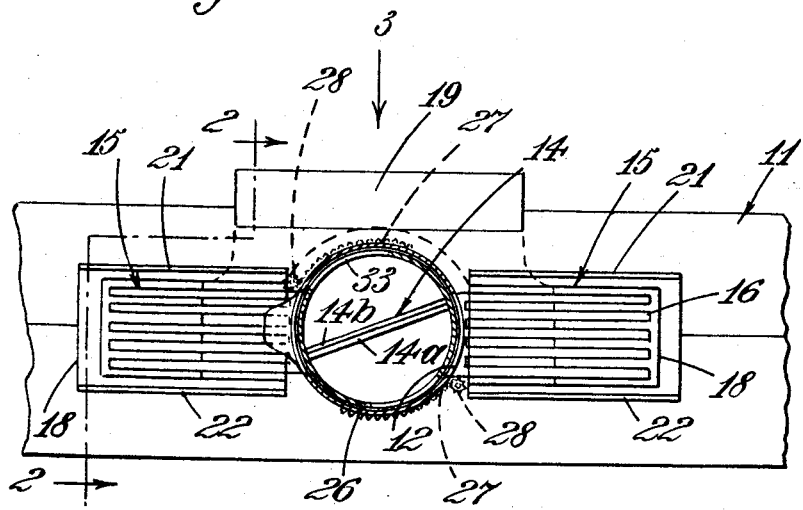
Figure 2:
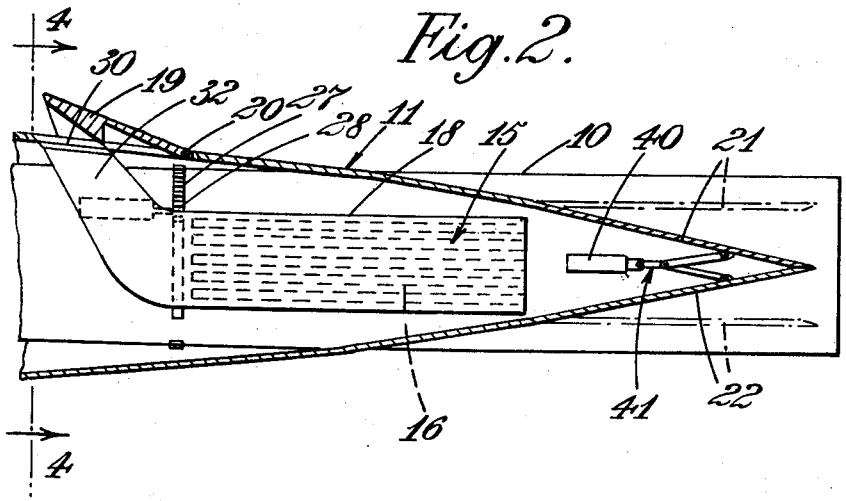
Figure 3:
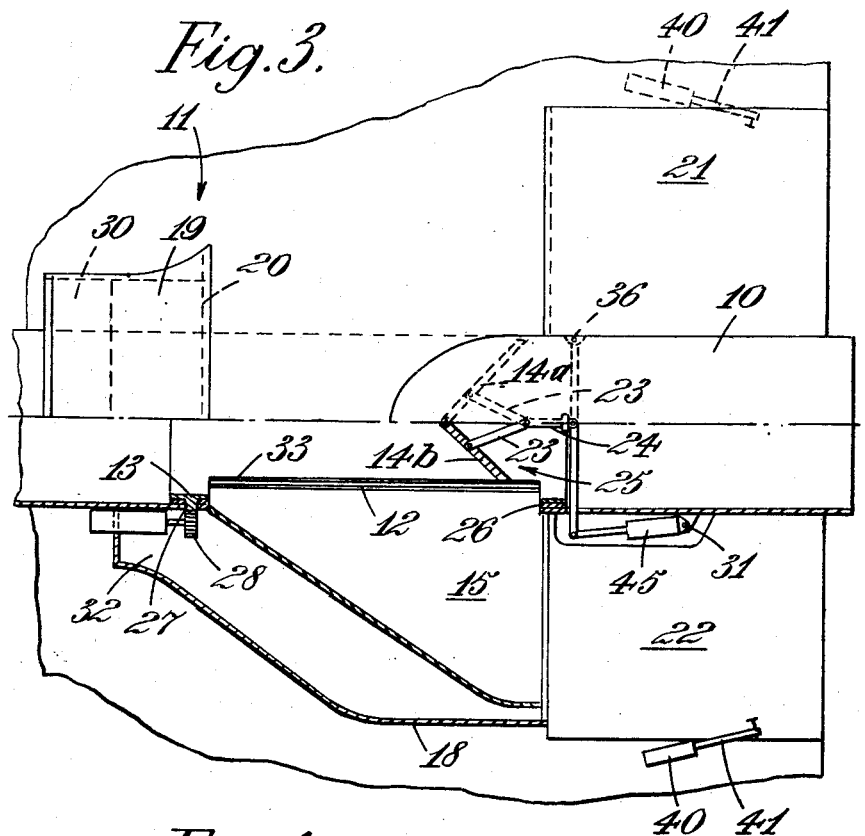
Figure 4:
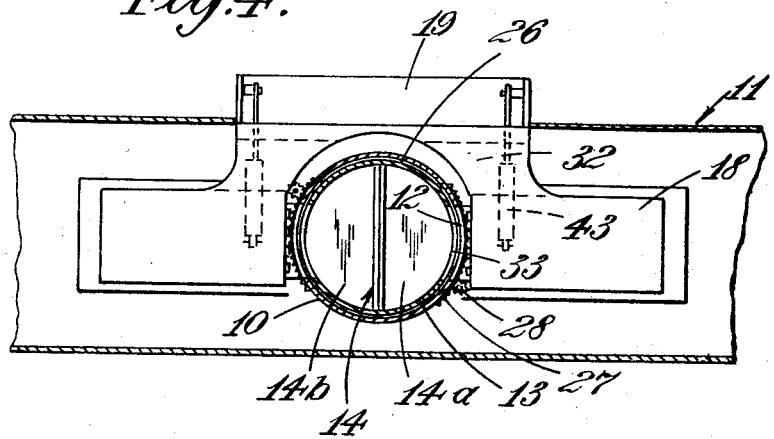

By way of example, a specific exhaust system according to the invention for a jet propulsion engine mounted in an aircraft main fixed supporting wing, will now be described with reference to the accompanying diagrammatic drawings in which:

FIGURE 1 is a rear view of a part of the wing and showing the system, in part in cross-section, FIGURE 2 is a section on the line 2—2 of FIGURE 1, FIGURE 3 is a view half in cross-section in the direction of arrow 3 in FIGURE 1, and FIGURE 4 is a cross-section on line 4—4 in FIGURE 2.

The exhaust system comprises a jet pipe 10, the downstream end part of which constitutes a conventional jet nozzle which normally discharges the jet stream from the engine. The jet pipe 10 has port means in the form of two oppositely located lateral ports 12 in its wall. Movable means in the form of a rotatable apertured masking sleeve 13 is provided in the jet pipe, the masking sleeve being rotatable to open and close the ports 12. Movable means is also provided for diverting the jet stream through the ports 12 when they have been unmasked, such means being constituted in the present example by a split butterfly valve 14.

Each of the ports 12 communicates with a noise suppression nozzle 15 which receives and discharges in the form of a propulsive jet gases diverted through it by the butterfly valve 14.

The sleeve 13 is mounted on rings 26 which carry racks 27 operated by rotary actuators driving pinions 28 positioned outside the jet pipe but within the wing, which is indicated at 11. To this end the racks are accommodated in slots in the jet pipe wall. The sleeve has a pair of oppositely located apertures 33 which correspond in shape and extend with the ports 12 and which may be aligned with the ports by rotation of the sleeve. The sleeve is also rotatable to mask off i.e. close the ports 12 as shown in FIGURE 1.

The split butterfly valve 14 is carried by the sleeve 13 and is adjustable by a linear actuator 45 mounted outside the jet pipe 10 between an inoperative position in which the wings 14a and 14b of the valve are folded together and faired in the jet pipe as shown in FIGURE 1 and an operative position in which it extends across and blocks the jet pipe 10. In the operative position of the valve as shown in FIGURE 3, the wings 14a and 14b of the valve diverge from one another in the direction of flow of the jet stream through the jet pipe so as to divide the jet stream and divert it smoothly through the ports 12.

Since the valve 14 is carried by the sleeve 13 it rotates with the sleeve. The valve is arranged so that its hinge axis is disposed vertically when the sleeve 13 is rotated to its position opening to ports 12. The valve is opened and closed by operation of the actuator 45 through links 23 connecting the wings 14a and 14b with one end of a rod 24 lying along the axis of rotation of the sleeve, the other end of the rod being connected by a swivel joint to a lever 25 which extends diametrically across the jet pipe and is pivoted at one end on a fulcrum pin 36 supported from the jet pipe wall. The other end of the lever passes through a slot in the wall of the jet pipe and is connected to the actuator 45. The actuator 45 is hinged to the wing structure as at 31.

Each port 12 communicates with an adjacent noise suppression nozzle 15 which may be welded to the jet pipe wall around the port 12. Each noise suppression nozzle 15 comprises five exhaust gas discharge passages 16 spaced apart and arranged one above the other. The discharge passages have an elongated or flattened flow section extending principally in the spanwise direction of the wing. The passages 16 communicate at their upstream end with the adjacent port 12 to receive the diverted jet stream and the passages 16 of each nozzle are arranged in a generally oblong sectioned air flow duct 18. The ducts 18 communicate through a bifurcated passage 32 at their upstream end with an intake opening 30 in the upper surface of the wing. The opening 30 is normally closed by a ram air scoop 19 retractable and extendable by linear actuators 43 by movement about a pivotal axis 20. During forward propulsion of the aircraft and with the scoop projected as shown, ram air flows into the intake opening 30, through the passage 32 and between and around the passages 16. The ram air cools the noise suppression nozzles before being discharged with the jet stream issuing from the passages 16.

The jet discharge from each nozzle 15 comprises a number of layers of propulsion gas each sheathed in cooling air.

It will be noted that the flanking relationship of the noise suppression nozzles 15 to the jet pipe 10 and the general elongated form of the noise suppression nozzles make them very suitable for location in an aircraft wing and permit noise suppression nozzles of large spanwise dimensions to be employed. The nozzles 15 are housed completely within the wing profile and therefore do not add to the drag.

That portion of the wing 11 which lies downstream of each nozzle 15 comprises a pair of pivoted flaps 21 and 22 which normally, that is to say in their closed position as seen in full line in FIGURE 2, from part of the wing profile, the flaps, in their closed position, together completing the wing profile downstream of the nozzle. When it is desired to use the nozzles 15 for noise suppression, the flaps 21 and 22 are pivoted away from each other to their open positions, as seen in dotted lines in FIGURE 2, so as to permit the discharge from the nozzles 15 to leave the wing 11. The flaps 21 and 22 are moved between their open and closed positions by the operation of linear actuators 40 which move the flaps through linkages indicated at 41.

Instead of making the flaps 21 and 22 open and close as described and shown, one or both flaps 21 and 22 may be operated to control the direction of discharge from the noise suppression nozzles. For example, the upper flap 21 in each case may be maintained in its closed position as part of the wing profile, and the lower flap 22 may be moved downwardly. The propulsion gas and air issuing from the nozzles 15 would then strike the upper flaps 21 and be deflected downwardly to give increased lift.

In a further alternative, the flaps 21 and/or 22 are pivotable outwardly beyond the dotted line position so as to form air brakes when in their open position.

The system as described with reference to the drawings is intended for operation as follows. For take off, when jet noise suppression is required, the ports 12 are unmasked by rotation of the sleeve 13 and the butterfly valve 14 is extended to obstruct the flow through the jet pipe 10 and divert the jet stream through the ports 12. In addition the ram air scoop 19 is projected into the airstream and the two sets of upper and lower flaps 21 and 22 are opened to provide for the escape out of the wing of the propulsive jets issuing from the nozzles 15. The jet stream from the jet propulsion engine, enters the jet pipe 10 where it is divided and diverted as two substantially equal streams through the oppositely located ports 12. Thence each stream enters the passages 16 of the noise suppression nozzles 15 for discharge therefrom together with the ram air entering the intake opening 30. The discharge from the nozzles 15 escapes to atmosphere between the opened flaps 21 and 22.

After take off when jet noise suppression is no longer required the butterfly valve 14 is returned to its inoperative or faired position, and the sleeve 13 is rotated to mask the ports 12. The jet stream then flows through the jet pipe 10 and is discharged from its downstream end in the normal manner, that is to say isolated from the nozzles 15 with their thrust-reduction effect. The intake opening 30 can be kept open until the nozzles have been satisfactorily cooled down and then shut by retracting the air scoop 19. The flaps 21 and 22 are then returned to their closed position. When it is desired to land, the jet stream is re-directed through the nozzles 15 in the manner described with reference to take off, except that the flaps may, if suitable arrangements are made, be pivoted outwardly so as to form air brakes.

Any other suitable means, such as air jets, may be used for diverting the jet stream through the ports 12 instead of the butterfly valve 14.

The ram air intake opening may be located in the leading edge of the wing or other structure housing the noise suppression nozzles. In this case no air scoop would be necessary although preferably means would be provided for closing the ram air intake when noise suppression or cooling was not required. Instead of having a single ram air intake, a separate ram air intake may be provided for each of the air flow ducts 18. If these are positioned in the upper surface of the wing, two air scoops such as 19 would be provided one for each of the air intakes.

The cooling air for the air passages of the noise suppression nozzles and for sheathing the gas streams issuing from them may be provided by other means, for example it may be supplied from a rotary air compressor such as the compressor of the engine.

I claim:

1. An aircraft having wing means and a jet propulsion engine, the engine having a jet pipe, which terminates in rearwardly-facing propulsion nozzle means, second rearwardly-facing propulsion nozzle means mounted in the wing means and comprising a stack of engine effluent gas discharge passages of elongated flow section spaced apart to cause the gas to be discharged as a plurality of separate streams, and guide means selectively operable into either of two conditions in one of which conditions the engine effluent gases are caused to pass to the first said propulsion nozzle means and in the other of which conditions the engine effluent gases are caused to pass to the second propulsion nozzle means.

2. An aircraft as claimed in claim 1, wherein the wing means has at its trailing edge hinged flap means forming part of the lower surface of the wing means, which flap means is operable into a closed position in which it completes the enclosure of the second nozzle means within the wing means and into an open position in which it permits engine effluent gases to be discharged rearwards through the second nozzle means to atmosphere.

3. An aircraft as claimed in claim 1, wherein the wing means comprise hinged flaps at their trailing edges which flaps are operable into a closed position in which they enclose the second nozzle means within the wing structure and into an open position in which they permit engine effluent gases to be discharged rearwards through the second nozzle means to atmosphere.

4. An aircraft having wing means and a jet propulsion engine, the engine having a jet pipe, which terminates in rearwardly-facing propulsion nozzle means, second rearwardly-facing propulsion nozzle means mounted in the wing means and comprising a stack of engine effluent gas discharge passages of elongated flow section spaced apart to cause the gas to be discharged to atmosphere as a plurality of separate streams, air discharge passages of elongated flow section interposed between said gas passages, guide means selectively operable into either of two conditions in one of which conditions the engine effluent gases are caused to pass to the first said propulsion nozzle means and in the other of which conditions the engine effluent gases are caused to pass to the second propulsion nozzle means, and means for supplying air to said air discharge passages.

5. An aircraft having wing means and a jet propulsion engine, the engine having a jet pipe, which terminates in rearwardly-facing propulsion nozzle means, air flow duct means mounted in the wing means and having a rearwardly-facing outlet, rearwardly-facing noise suppression propulsion nozzle means mounted in the wing means and connected for receiving engine effluent gases which noise suppression nozzle means comprises a stack of engine effluent gas discharge passages of flattened flow section spaced apart in the air duct means to cause the gases to be discharged to atmosphere as a plurality of separate streams, guide means selectively operable into either of two conditions in one of which conditions the engine effluent gases are caused to pass to the first said propulsion nozzle means and in the other of which conditions the engine effluent gases are caused to pass to the second propulsion nozzle means, and means for causing an air flow through the air flow duct means to the said outlet thereof.

6. An aircraft as claimed in claim 5, wherein said means for causing an airflow through the said air flow duct comprises a forwardly facing air-scoop mounted on the aircraft in the airstream, the duct having an inlet communicating with the scoop.

7. An aircraft as claimed in claim 5 wherein the engine comprises an air compressor and the air duct means is connected to receive air under pressure from the compressor.

8. An aircraft having wing means and a jet propulsion engine, the engine having a jet pipe, which terminates in rearwardly-facing propulsion nozzle means, air flow duct means mounted in the wing means and having a rearwardly-facing outlet, rearwardly-facing noise suppression propulsion nozzle means mounted in the wing means and connected for receiving engine effluent gases which noise suppression nozzle means comprises a stack of engine effluent gas discharge passages of flattened flow section spaced apart in the air duct means to cause the gases to be discharged to atmosphere as a plurality of separate streams, guide means selectively operable into either of two conditions in one of which conditions the engine effluent gases are caused to pass to the first said propulsion nozzle means and in the other of which conditions the engine effluent gases are caused to pass to the second propulsion nozzle means and means for causing an air flow through the air flow duct means to the said outlet thereof, comprising a forwardly-facing air-scoop mounted on the wing means, the duct having an inlet communicating with the scoop, and means for selectively extending the scoop into the air stream and for retracting the scoop into the wing means.

9. An aircraft having wing means and a jet propulsion engine, the engine having a jet pipe which is mounted in the wing means and which terminates in a first rearwardly-facing propulsion nozzle, two propulsion nozzle structures mounted in the wing means one on each side of the said first nozzle each of which structures comprises a manifold and a plurality of rearwardly-facing gas discharge passages having their upstream ends in communication with the manifold and their downstream ends facing rearwardly and opening to atmosphere, which passages are of flattened flow-section and are arranged parallel and close to, but spaced from, each other in the form of a stack, valve means movable into either of two alternative positions in the first of which the valve means is operative to prevent effluent gases flowing through the first nozzle to atmosphere and to place the manifolds in communication with the jet pipe to enable the effluent gases to flow through the gas discharge passages of the said two nozzle structures, and in the second of which is operative to cut off communication between the manifolds and the jet pipe and to place the first nozzle in communication with the jet pipe to permit effluent gases from the engine to flow through the first nozzle to atmosphere, air discharge passages between the said gas passages, and means for supplying air to said air discharge passages.

References Cited in the file of this patent

UNITED STATES PATENTS

| | | |
|---|---|---|
| 2,297,910 | Neuland | Oct. 6, 1942 |
| 2,372,250 | Burnelli | Mar. 27, 1945 |
| 2,420,323 | Meyer et al. | May 13, 1947 |
| 2,486,967 | Morrison | Nov. 1, 1949 |
| 2,523,938 | Berliner | Sept. 26, 1950 |
| 2,625,234 | Fina | Jan. 13, 1953 |
| 2,681,548 | Kappus | June 22, 1954 |
| 2,847,822 | Hausmann | Aug. 19, 1958 |
| 2,865,169 | Hausmann | Dec. 23, 1958 |
| 2,912,189 | Pouit | Nov. 10, 1959 |
| 2,928,627 | Johnson | Mar. 15, 1960 |
| 2,944,392 | Tyler | July 12, 1960 |

FOREIGN PATENTS

| | | |
|---|---|---|
| 735,645 | Great Britain | Aug. 24, 1955 |